UNITED STATES PATENT OFFICE.

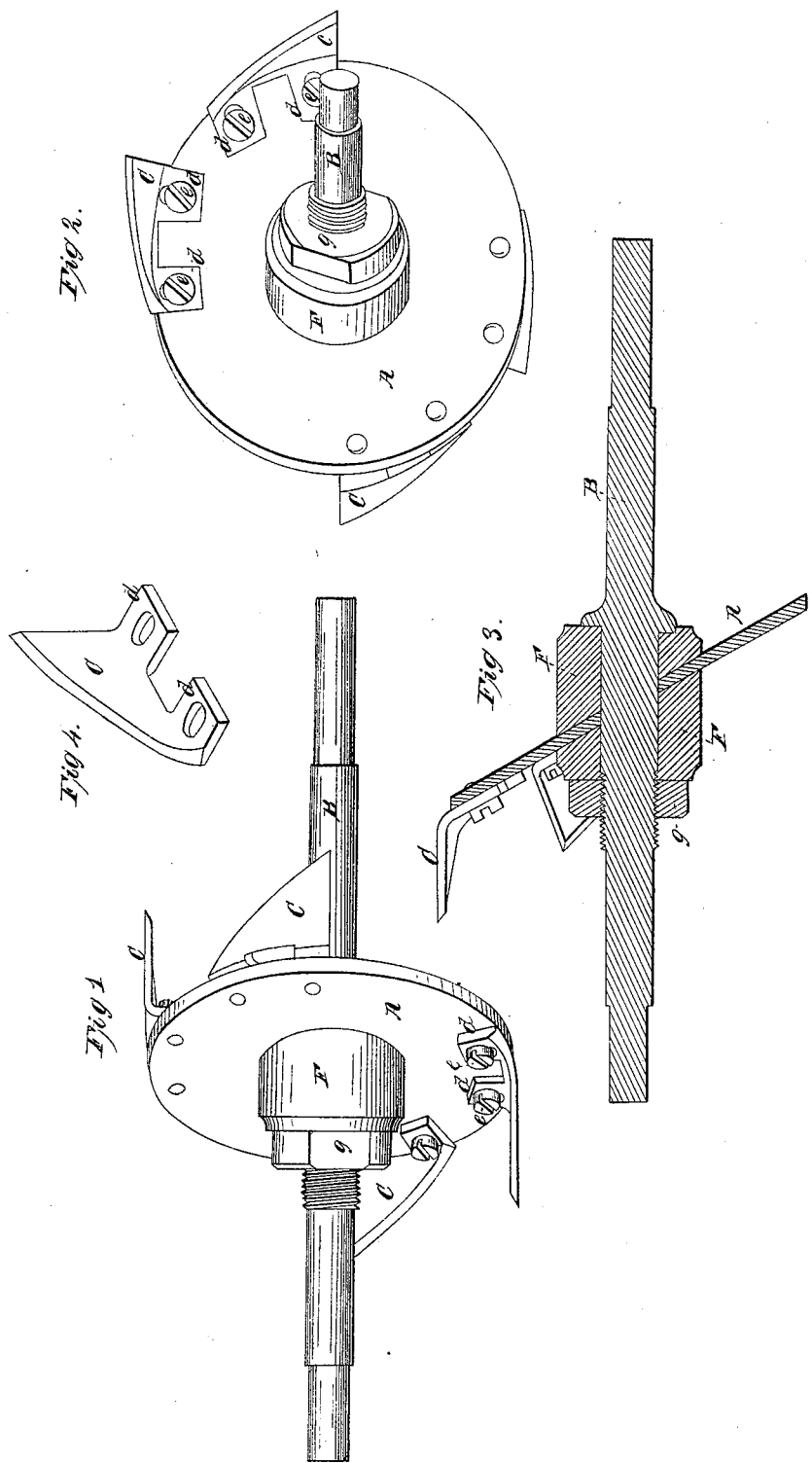
Patton & Fergus,
Cutter Head.
N° 9,100. Patented July 6, 1852.

JAS. M. PATTON AND WM. F. FERGUS, OF PHILADELPHIA, PENNSYLVANIA.

CUTTER-HEAD FOR PLANING.

Specification of Letters Patent No. 9,100, dated July 6, 1852.

*To all whom it may concern:*

Be it known that we, JAMES M. PATTON and WM. F. FERGUS, of the city and county of Philadelphia and State of Pennsylvania, have invented a new and Improved Elliptical Reducing and Planing Instrument; and we do hereby declare that the following is a full and exact description thereof, reference being had to the accompanying drawings, making a part of this specification, in which—

Figure 1, is a top view, Fig. 2, a side elevation, Fig. 3, a vertical longitudinal section, and Fig. 4, a perspective view of a cutter detached.

Similar letters indicate like parts in all the figures.

The nature of our invention consists in the formation of a reducing and planing instrument by the combination of a series of obliquely acting cutters with an elliptical shaped plate, which is secured in such a position upon its arbor as to cause every portion of its periphery to be equidistant from its axis of rotation; when the said obliquely acting cutters are so arranged upon the elliptical plate as to cause each cutter to have but a slight action when it is first brought in contact with the material operated upon, and to increase in the depth of its action until it is arrested by the periphery of the said elliptical plate being brought in contact with the surface of the said material; which action of the periphery of the said elliptical plate, also serves to hold down the material during the action of the cutters.

A, is the elliptical plate, or cutter holder, which is placed upon the arbor B, between the holders F, F, and firmly secured in its position by means of the shoulder $h$, upon one side, and the screw nut $g$, upon the other, as shown in Fig. 3,—or in any other suitable and secure manner. One half of the cutters C, C, are secured to one side of the elliptical plate A, and the other half to its opposite side, by means of the set screws $e, e$, as shown in the drawings. The said set screws passing through slots in the legs $d, d$, of the plate A, which enables the cutters to be adjusted in their proper positions, so as to make a deep or a shallow cut. The cutters are so arranged upon the plate A, that the inner forward portion of each cutter's edge will project but slightly beyond the periphery of the plate, and thence gradually incline outward to the outer extremity of the same. The depth of the action of each cutter being gaged by the distance that its cutting edge projects beyond the periphery of the plate A;—the material operated upon, being held down during the operation of the cutters, by the bearing of the periphery of the plate A, upon the said material, immediately opposite and contiguous to the point where each cutter operates.

The series of cutters C, C, are of such a width, and number, and placed in such positions upon the elliptical plate A, as to insure their acting upon the entire surface of the material that they may be operated upon.

Our reducing and planing instrument, may be used upon wood, or any other material which can be operated upon by such an instrument.

What we claim as our invention and desire to secure by Letters Patent, is—

Our improved elliptical reducing and planing instrument, composed of obliquely acting cutters secured to an elliptical plate in such a manner that the periphery of the said plate, will gage the depth of the action of the cutters, and also serve to hold down the material operated upon, substantially as herein set forth.

The above specification of our improved elliptical reducing and planing instrument signed this 21st day of April 1852.

JAS. M. PATTON.
WM. F. FERGUS.

Witnesses:
Z. C. ROBBINS,
J. S. BROWN.